(12) United States Patent
Martin

(10) Patent No.: US 6,434,883 B1
(45) Date of Patent: Aug. 20, 2002

(54) VINE SUPPORT WITH SNAP-IN CROSS ARM

(75) Inventor: Steve Martin, Hilmar, CA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 09/502,071

(22) Filed: Feb. 10, 2000

(51) Int. Cl.[7] .................. A01G 17/06; A01G 17/14
(52) U.S. Cl. .................. 47/46; 47/44; 140/82; 24/455
(58) Field of Search ............... 47/46, 44, 45, 47/47; D25/100; 24/455; 140/82; 248/67.7

(56) References Cited

U.S. PATENT DOCUMENTS

| | | |
|---|---|---|
| 1,485,924 A | 3/1924 | Hobbs |
| 1,911,979 A | 5/1933 | Vaars, Jr. et al. |
| 2,004,983 A | 6/1935 | Goldberg |
| 3,391,491 A | 7/1968 | Daly |
| 3,800,365 A | 4/1974 | Bruggert |
| 4,270,581 A | 6/1981 | Claxton et al. |
| 4,383,396 A | 5/1983 | Waugh |
| 4,610,107 A | 9/1986 | Testa |
| 4,642,940 A | 2/1987 | Ettema et al. |
| 4,703,584 A | 11/1987 | Chazalnoel |
| 4,750,293 A | 6/1988 | Dyke |
| 4,965,961 A | 10/1990 | Broyles |
| 4,971,282 A | 11/1990 | Dickinson |
| 5,501,035 A | 3/1996 | Downer et al. |
| 5,557,883 A | 9/1996 | Walker |
| 5,916,028 A | 6/1999 | Downer et al. |
| D436,505 S | * 1/2001 | Mann ........... D8/1 |

FOREIGN PATENT DOCUMENTS

CH  620334 A  * 11/1980

* cited by examiner

Primary Examiner—Peter M. Poon
Assistant Examiner—Andrea M. Valenti
(74) Attorney, Agent, or Firm—Harris Zimmerman

(57) ABSTRACT

A vine support system for supporting vine crops includes a vertical post having one or more slotted apertures extending horizontally therethrough. A plurality of cross arms are provided, each cross arm fashioned and dimensioned to snap-engage in one of the slotted apertures and to extend horizontally outwardly from the post. The cross arms are adapted to support lateral trellis wires which engage the canes of a vine crop. Each cross arm is a planar member elongated in a lateral direction and vertically oriented, and includes a pair of L-shaped trellis wire slots opening upwardly at laterally opposed ends of the cross arm. The slots are dimensioned to capture and support trellis wires. A pair of spring tabs are integrally formed with the cross arm and bent outwardly therefrom. Each cross arm is dimensioned to be pushed through the slotted aperture of the vertical post described above, and the spring tab is deflected and compressed as it passes through the aperture. Thereafter, the spring tab returns (snaps back) to its extended position to prevent withdrawal of the cross arm from the slotted aperture. This arrangement permits the installation of cross arms in vertical posts without recourse to screws, bolts, or twisted wire structures, and without the use of any tool, thereby simplifying the process of trellis construction to an irreducible minimum.

8 Claims, 3 Drawing Sheets

VINE SUPPORT WITH SNAP-IN CROSS ARM

BACKGROUND OF THE INVENTION

This invention relates to vineyard trellis systems, and, more particularly, to a vine support system employing trellis wires supported on cross arms.

Growing and harvesting grapes and other similar vine crops tends to involve a great amount of care and labor. In addition to the usual necessities such as water and fertilizer, the vines must be trained on a trellis to support the grapes for proper growth, ripening, and harvesting. In addition, the vines must be pruned regularly and trained to intertwine with the trellis. Establishing a trellis system is a primary requirement for a vineyard, and the time and materials involved in setting up a trellis for each vine involves a large expenditure. Any measure that can reduce the cost of materials and labor in this regard comprises a useful advance over the prior art.

A typical vineyard arranged to be mechanically harvested will be planted so that there will be a plurality of parallel rows with spaced apart grape plants in each row. A trellis system is provided by installing a plurality of vertical posts spaced along each row, usually a post at each plant with an end post at each end of the row. One or more trellis wires are extended along each row, the wires supported by the vertical posts and anchored under tension to the end posts. The vines are grown along the trellis wires, the vines growing in a manner and at a height so that the grapes can be readily harvested therefrom.

One prior art method of attaching the trellis wires to the intermediate wooden posts has been by the use of simple staples. In vineyards that are not mechanically harvested, this is a rapid, inexpensive and effective way to form a trellis system. However, staples have been shown not to withstand the rigors of mechanical harvesting, particularly when the mechanical technique involves shaking the trellis to cause the grapes to fall. Shaking may pull the staples from the posts. Also, wooden stakes may not endure many years of exposure to the elements, and must be replaced periodically.

In recent years more sophisticated trellis systems have been introduced, using metal or plastic posts to carry the trellis wires. The posts may support various types of arms that are screwed or bolted to the posts to engage the trellis wires, or the trellis wires may be secured to the posts by twisted wire arrangements. Although these systems generally have proven to be more sturdy and durable than the older wooden grape stakes, their use typically involves more labor to install the support arms or twisted wire ties. There is an unmet need in the prior art for a vineyard trellis system that is simple and inexpensive to install while being strong enough to withstand mechanical harvesting and long-term exposure to the elements.

SUMMARY OF THE INVENTION

The present invention generally comprises a trellis system for supporting grape vines and similar crop or flower plants. A salient feature of the invention is that it is easily installed and maintained, and involves a minimum of expense for materials and labor.

In one aspect, the trellis system includes a vertical post having one or more slotted apertures extending horizontally therethrough. A plurality of cross arms are provided, each cross arm fashioned and dimensioned to snap-engage in one of the slotted apertures and to extend horizontally outwardly from the post. The cross arms are adapted to support lateral trellis wires which engage the canes of a vine crop.

In a further aspect of the invention, a trellis cross arm is fashioned from a generally planar sheet of metal or plastic, by stamping or molding. The cross arm is elongated in a lateral direction, and includes a pair of L-shaped slots opening upwardly in an upper edge portion of the cross arm and disposed at laterally opposed ends of the cross arm. The slots are dimensioned to capture and support trellis wires. In addition, a pair of spring tabs are stamped or otherwise formed from the planar sheet of material and bent outwardly therefrom. The L-shaped slots and the spring tabs are arrayed laterally in enantiomorphic relationship. Each cross arm is dimensioned to be pushed through the slotted aperture of the vertical post described above, and the spring tab is deflected and compressed as it passes through the aperture. Thereafter, the spring tab returns (snaps back) to its extended position to prevent withdrawal of the cross arm from the slotted aperture. This arrangement permits the installation of cross arms in vertical posts without recourse to screws, bolts, or twisted wire structures, and without the use of any tool, thereby simplifying the process of trellis construction to an irreducible minimum.

In a further aspect of the invention, there is provided a trellis system that utilizes a plurality of vertical posts for trellis wire support. Each vertical post is comprised of a channel-like member formed of steel or plastic, the channel including opposed sides having vertically extending, laterally protruding convex portions. The web of the channel includes a vertically extending concave portion, and the vertically extending opening of the channel is defined by a pair of convex curved flanges extending partially into the channel cavity from the opposed sides. The convex portions and concave portion provide enhanced bending strength to the vertical post, while the channel opening prevents accumulation of water or debris within the vertical post.

Each vertical post further includes a plurality of slotted apertures in laterally paired relationship, the slotted apertures extending through the side walls of the channel. Each slotted aperture includes a pair of vertical slots formed in a channel wall in adjacent, spaced apart relationship, with a linking slot extending from the lower end of one slot to the adjacent slot. Each slot is provided with a vertical dimension sufficient to receive a cross arm of the invention in freely sliding relationship, the slot width being greater than the thickness of the cross arm but less than the width of the extended spring tab, thereby facilitating the snap-engagement of the spring members as the cross arm is passed laterally through the paired slotted apertures of the channel member.

DESCRIPTION OF THE REFERRED EMBODIMENTS

Figure 5:
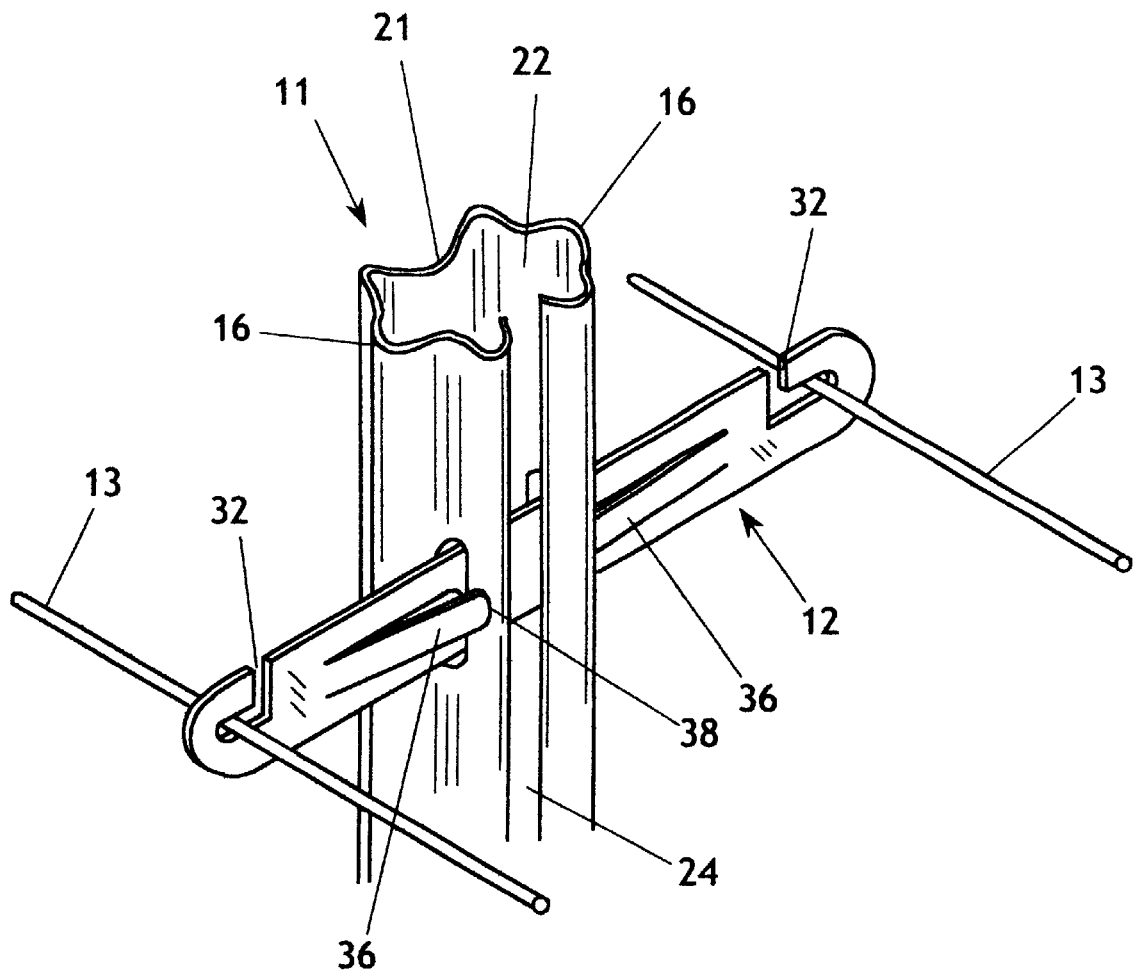
FIG. 5 is a perspective view of the vine support system of the present invention, showing the cross arm supporting a pair of trellis wires.

The present invention generally comprises a vine support system for grape vines and similar plants. With reference to FIG. 5, the invention includes at least one vertical post 11 which supports at least one cross arm 12. In a typical installation, a plurality of posts 11 are employed in a spaced apart array, each bearing cross arms 12 to support a pair of trellis wires 13 extending generally horizontally to engage and carry the canes of vine plants.

Figure 2:
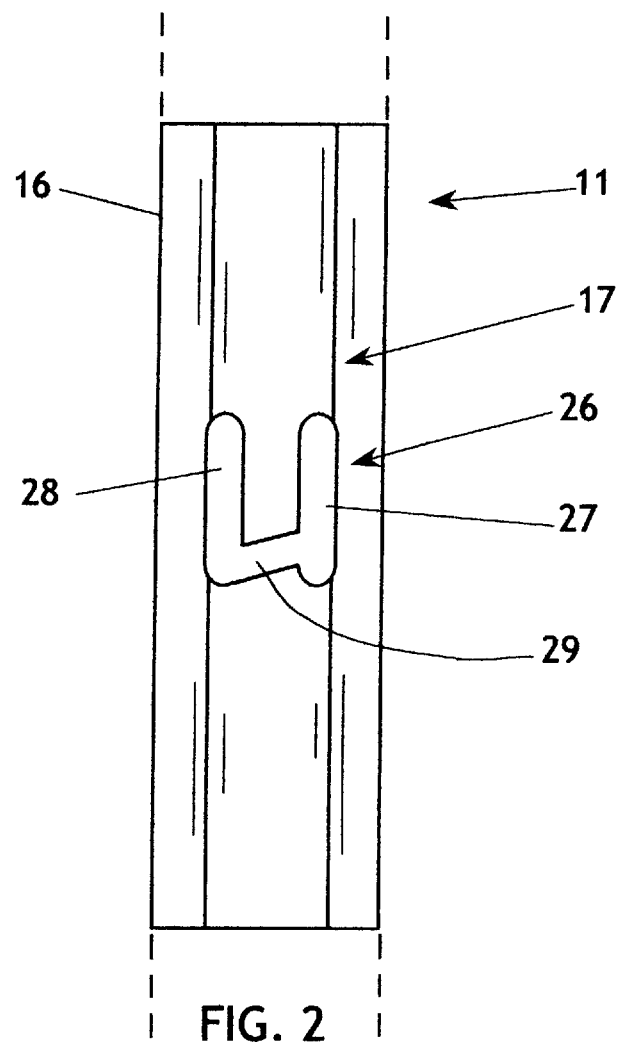
FIG. 2 is a side elevation of the vertical post of the vine support system of the present invention, showing a slotted aperture of the post.
Figure 3:
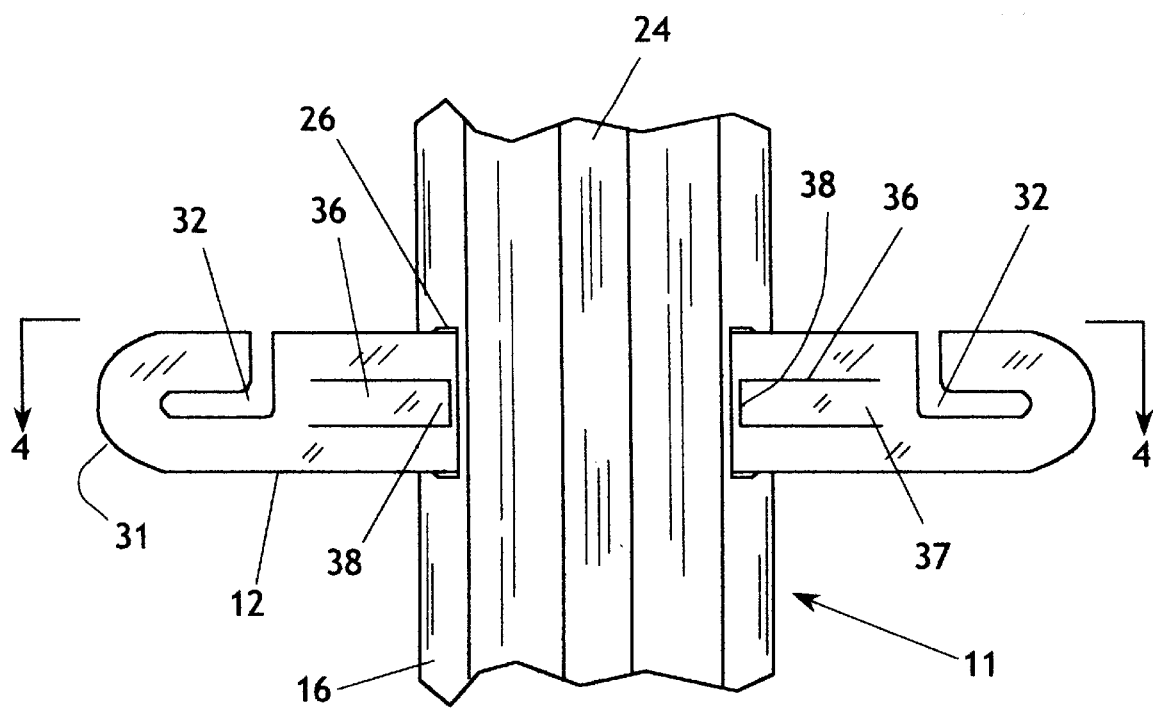
FIG. 3 is a front elevation of the vertical post of the invention, shown with a cross arm engaged in the post.
Figure 4:
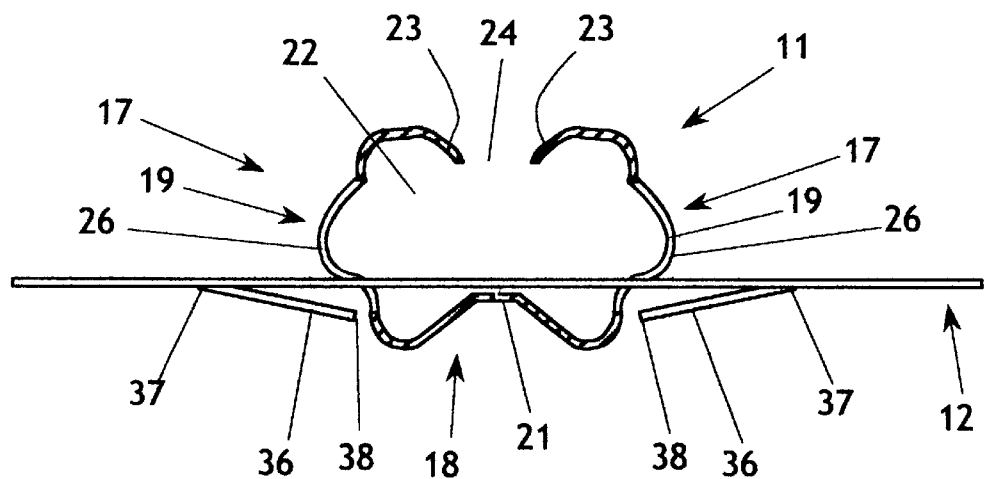
FIG. 4 is a cross-sectional end view taken along line 4—4 of FIG. 3.

With regard to FIGS. 2–4, each vertical post 11 is comprised of a channellike member 16 having opposed sides 17 joined by a web 18. Each side 17 includes a vertically extending, laterally protruding convex portion 19. The web 18 includes a vertically extending concave portion 21. The channel member 16 includes an interior cavity 22, and a pair of convex curved flanges 23 extend from the sides 17 toward each other to define a vertically extending channel opening 24. The convex portions 19 and concave portion 21 provide enhanced bending strength to the vertical post 11, while the channel opening 24 prevents accumulation of water or debris within the vertical post. The post is preferably formed of steel that is coated or galvanized, although polymer or resin materials may also be used.

With regard to FIG. 2, each post 11 is provided with a plurality of slotted apertures 26, each extending through a side wall 17 of the post. The slotted apertures 26 are disposed in laterally paired relationship; that is, two apertures 26 are disposed in aligned registration in opposed side walls 17. Each slotted aperture 26 is comprised of two vertical slots 27 and 28 disposed in adjacent, spaced relationship, and a linking slot 29 extends from the lower end of slot 28 to a lower end portion of slot 27.

A plurality of paired apertures 26 may be provided, the pairs spaced vertically along the sides of the post 11. The apertures 26 may be formed by stamping or punching, or may be cut using any appropriate tool.

Figure 1:
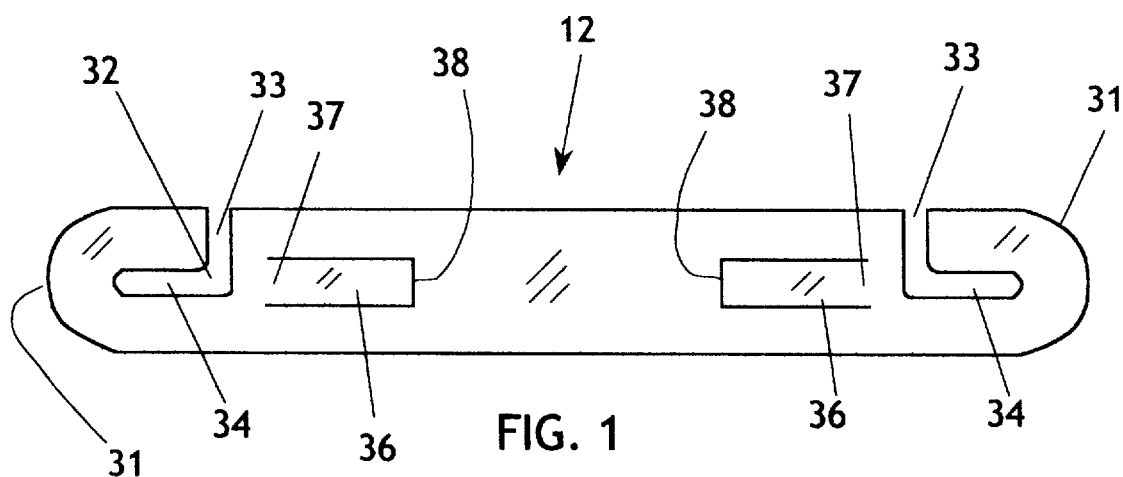
FIG. 1 is a plan view of the cross arm of the vine support system of the present invention.

With reference to FIG. 1, each cross arm 12 comprises a laterally extending, vertically oriented panel formed of a generally planar sheet of metal or plastic. The opposed ends 31 are rounded to facilitate insertion of the cross arm through the paired slotted apertures 26, as will be explained below. A pair of L-shaped slots 32 are provided, each adjacent to one end 31. The upper leg 33 of each slot 32 opens at the upper edge of the arm 12 and the lower leg 34 extends laterally outwardly toward the respective end 31. A pair of spring tabs 36 are also provided, each tab comprising a generally rectangular panel that has one outer end 37 integral with the arm 12 and an inner end 38 that is deformed from the plane of the arm 12, as shown most clearly in FIG. 4. The free inner ends 38 of the spring tabs 33 extend each toward the other. The arm 12 is formed of an elastically deformable material, and each tab 33 acts like a leaf spring extending integrally from the arm 12.

The cross arm 12 is operatively associated with the vertical post 11 as shown in FIGS. 3–5. Each slot 27 or 28 is provided with a vertical dimension sufficient to receive a cross arm of the invention in freely sliding relationship, while the slot width is greater than the thickness of the cross arm but less than the width of the extended spring tab 36, thereby facilitating the snap-engagement of the spring members as the cross arm is passed laterally through the paired slotted apertures of the channel member. That is, a cross arm end 31 (either end) may be passed through a slot 27 (or 28), and urged therethrough. As the spring tab 36 encounters the slot 27 (or 28), the slot edges deflect the spring tab 36 toward the plane of the cross arm, and the spring tab 36 passes entirely through the slot. The spring tab 36 likewise passes through the aligned slot in the opposite side of the vertical post 11, resulting in the assembly shown in FIGS. 3–5. In this configuration, neither of the free inner ends 38 of the extended spring tabs 36 can pass through the slot 27 (or 28), thus retaining the cross arm 12 in the vertical post. It may be noted that this assembly is achieved without the use of any fastener, or any tool whatsoever. More that one cross arm 12 may be assembled to the vertical post 11 in other vertically spaced slotted apertures 26 (not shown).

Thereafter, trellis wires 13 are placed in the slots 32, and gravity loading causes the wires 13 to remain therein. The wires 13 may extend horizontally between the cross arms of adjacent vertical posts 11, and may continue for any convenient distance. Although this assembly is intended to be permanent, it is possible to remove any cross arm 12 from the slotted aperture 26 by compressing the free end 38 of one of the spring tabs 36, and thereafter passing the arm 12 through the aligned slots 26 until it is free of the post 11.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A vine support system, including:
    at least one post extending generally vertically and adapted to be ground supported;
    at least one slotted aperture formed in said post;
    at least one cross arm dimensioned to extend through said slotted aperture and defining a cross arm distal end extending outwardly from said post in a lateral direction;
    means on said at least one cross arm for snap-engaging in said slotted aperture to retain said at least one cross arm on said post;
    said means for snap-engaging including at least one spring tab extending from said at least one cross arm, said spring tab including a fixed end joined to said cross arm distal end and a free end extending in said lateral direction from said fixed end toward a medial portion of said cross arm, said free end spaced from said cross arm and being elastically deformable by passage through said slotted aperture as said cross arm is inserted in said slotted aperture in a first direction; said free end impinging on an outer surface of said post and preventing removal of said cross arm from said slotted aperture by translation in a second direction opposite to said first direction.

2. The vine support system of claim 1, wherein said cross arm includes a member extending in said lateral direction, and a pair of trellis wire slots disposed in opposite ends of said member.

3. The vine support system of claim 2, wherein said trellis wire slots each include a first portion opening upwardly in an upper edge portion of said member, and a second portion extending laterally in said member.

4. The vine support system of claim 3, wherein said first and second portions are joined in an L-configuration.

5. The vine support system of claim 1, wherein said opposed ends of said member include smoothly curved portions to facilitate passage through said at least one slotted aperture.

6. A vine support system, including:

a post extending generally vertically and adapted to be ground supported, said post including laterally opposed side walls;

a pair of slotted apertures, each formed in one of said side walls, said pair of slotted apertures being disposed in alignment;

a cross arm dimensioned to pass through said slotted apertures and to extend outwardly of said side walls to define distal cross arm portions extending laterally outwardly from both said pair of side walls:

a pair of trellis wire slots, each disposed in one of said cross arm portions;

snap-engaging means for retaining said cross arm in said pair of slotted apertures;

said snap-engaging means including a pair of spring tabs extending from said cross arm;

each spring tab having one end joined to a respective one of said cross arm distal portions, and a free end extending laterally from said one end, said free ends of said spring tabs extending each toward the other and impinging on outer surfaces portions of said post.

7. The vine support system of claim 6, wherein each of said free ends of said spring tabs is spaced from said cross arm and is elastically deflectable to pass through said pair of slotted apertures in said side walls.

8. The vine support system of claim 6, wherein said trellis wire slots each comprise an L-shaped slots, each L-shaped slot opening upwardly in an upper edge of a respective cross arm portion.

* * * * *